United States Patent

[11] 3,628,800

| [72] | Inventor | Herbert F. Prasse<br>Town and Country, Mo. |
|---|---|---|
| [21] | Appl. No. | 35,000 |
| [22] | Filed | May 6, 1970 |
| [45] | Patented | Dec. 21, 1971 |
| [73] | Assignee | Ramsey Corporation<br>St. Louis, Mo. |

[54] COMBINATION CIRCUMFERENTIAL EXPANSION AND SPRING FINGER OIL CONTROL PISTON RING
12 Claims, 7 Drawing Figs.

[52] U.S. Cl. ............................................ 277/140, 277/169
[51] Int. Cl. ............................................ F16j 9/20
[50] Field of Search ............................................ 277/140, 139, 141, 169, 149

[56] References Cited
UNITED STATES PATENTS

| 3,447,811 | 6/1969 | Mayfield | 277/169 X |
| 3,191,947 | 6/1965 | Hamm | 277/139 |
| 3,460,846 | 8/1969 | Schmidt et al. | 277/140 |

*Primary Examiner*—Samuel B. Rothberg
*Attorney*—Hill, Sherman, Meroni, Gross & Simpson ABSTRACT: A two component oil control piston ring accommodating wide tolerances in the dimensions of the components and having three-ring contact with the piston cylinder preventing cocking or tilting while increasing sealing efficiency. One of the components is a conventional thin rail ring and the other component is a spacer-expander ring carrying the rail ring and having two axially spaced cylinder-wall-engaging rings or scraping edges and upstanding spring fingers engaging the inner periphery of the rail ring. The spring fingers act independently of the contraction and expansion of the spacer-expander so that the peripheries of both rings may sealingly engage the cylinder wall regardless of radial depth variations of the rail ring.

PATENTED DEC 21 1971
3,628,800
SHEET 1 OF 2
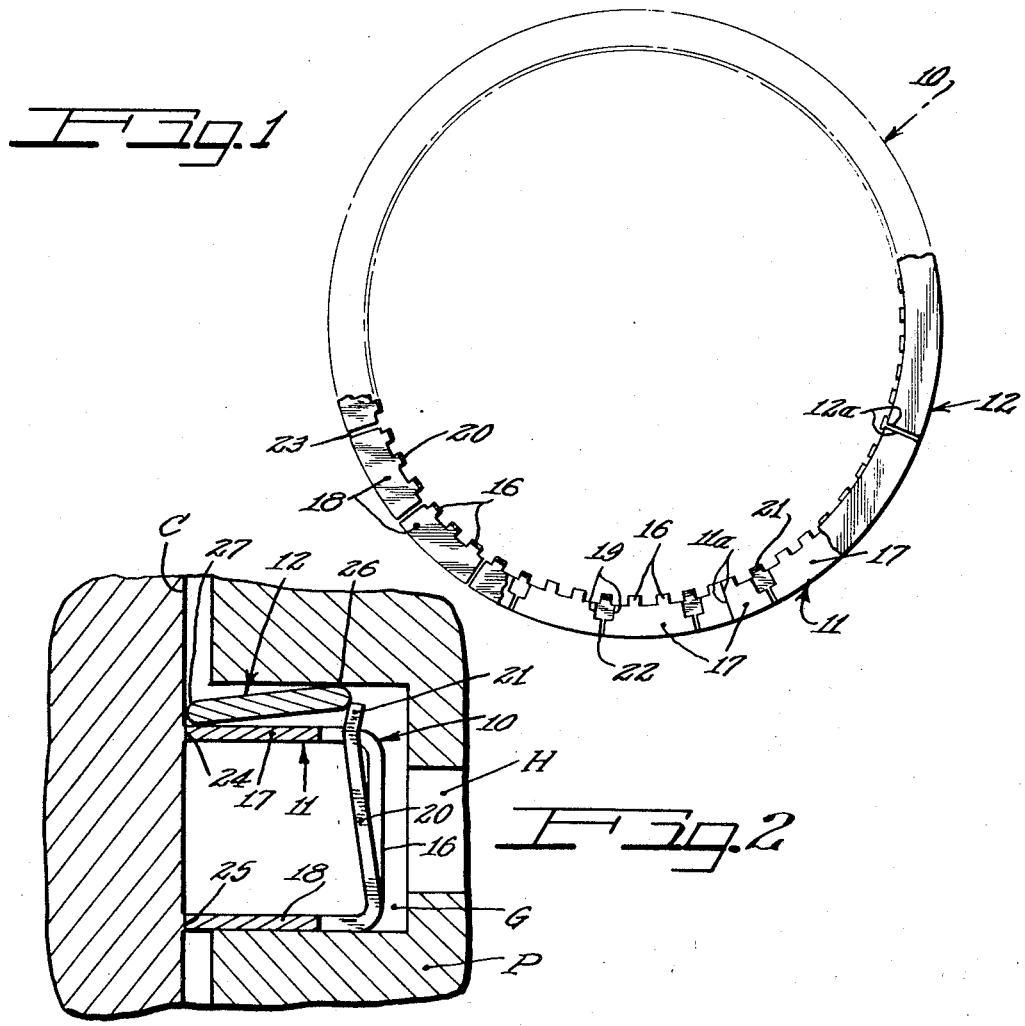
Fig.1
Fig.2
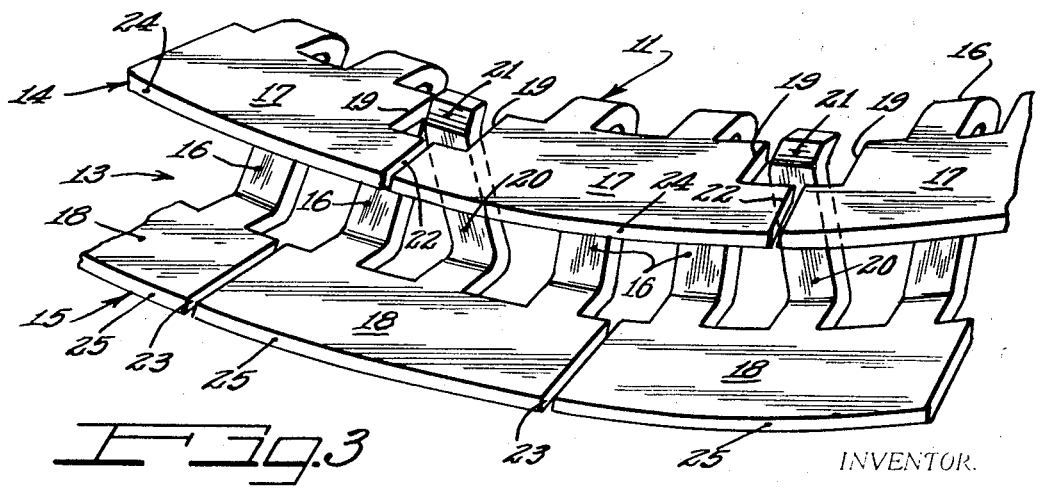
Fig.3
INVENTOR.
Herbert F. Prasse
BY Hill, Sherman, Meroni, Gross & Simpson
ATTORNEYS

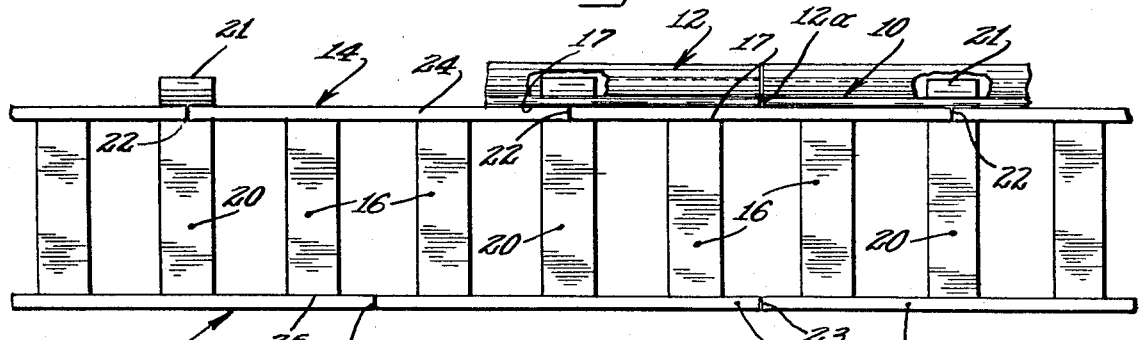
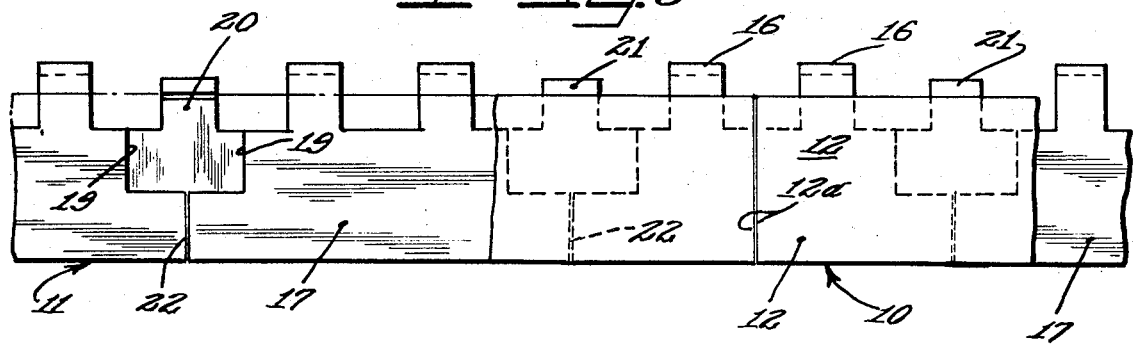
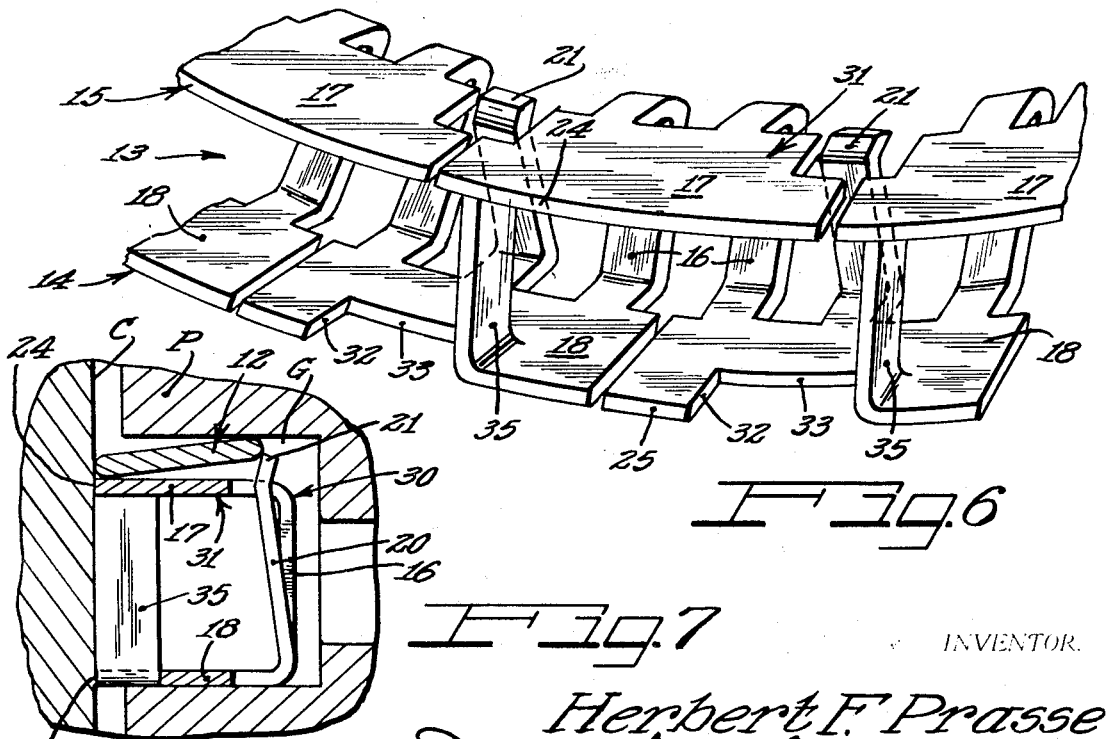

COMBINATION CIRCUMFERENTIAL EXPANSION AND SPRING FINGER OIL CONTROL PISTON RING

BACKGROUND OF THE INVENTION

1. Field of The Invention

This invention relates to the packing or piston ring art and more particularly to two component oil control piston rings.

2. Description of the Prior Art

Two component oil control piston rings including a single rail ring and a spacer-expander ring are known in the prior art, for example in the Shirk U.S. Pat. No. 2,635,022 dated Apr. 14, 1953 (FIGS. 14–17) and in the Hamm U.S. Pat No. 3,191,947 dated June 29, 1965. In these arrangements only two scraping edges or seals were provided and there was a tendency for the spacer-expander to tile in the ring groove unless tolerance limits were closely held especially in the radial width of the rail ring.

SUMMARY OF THE INVENTION

This invention now provides a two component oil control piston ring including a rail ring and a spacer-expander ring cooperating to provide three scraper rings or seals and accommodating wide tolerances without loss of sealing load both on the ring groove and on the cylinder wall while at the same time preventing tilting or cocking of the assembly in the ring groove. According to this invention, a spacer-expander ring is provided with two axially spaced segmented rings each forming a scraping edge engaging the cylinder wall. In addition, a rail ring is supported on one of these rings of the spacer-expander and the other ring of this spacer-expander has spring fingers acting on the inner periphery of the rail ring to create an expanding force thereon independently of the load on the scraping edges created by contraction of the ring body. In addition, the spring fingers also have angled lips engaging the inner periphery of the rail ring to thrust it into sealing engagement with a sidewall of the ring groove. The segments constituting the axially spaced radial ring portions of the spacer-expander are substantially abutted together when the ring is contracted in use to form continuous scraping edges or, if desired, struts can be lanced from the segments of one ring to span the channel between the two rings of the spacer-expander to form barriers against entry of the rail ring. In the strut-equipped rings of this invention portions of the ring segments behind the struts form full circumferential supports for the rail ring and block radial leakage.

It is then an object of this invention to provide a two component oil control ring having three sealing peripheries and accommodating wide dimension variations in the components without permitting tilting of the assembly in the ring groove.

Another object of this invention is to provide an oil control ring composed of a single thin rail ring and a spacer-expander having two axially spaced scraping edges and spring fingers expanding the rail ring into sealing engagement with the cylinder wall and with a side of the ring groove.

Another object of this invention is to provide a combination spacer-expander and rail ring oil ring assembly for pistons which will not tilt in the ring groove and will maintain three rings of seals scraping the cylinder wall.

Another object of this invention is to provide a spacer-expander for an oil control ring assembly which has two axially spaced rings of cylinder wall engaging segments, one ring of which supports a rail ring and the other ring of which has axially extending spring fingers expanding the rail ring.

A still further object of this invention is to provide a spacer-expander for oil rings with two cylinder-wall-engaging scraping edges and a plurality of independent spring fingers for expanding a rail ring.

Other and further objects of this invention will be apparent to those skilled in this art from the following detailed description of the annexed sheets of drawings which show preferred embodiments of this invention.

BRIEF DESCRIPTION OF THE DRAWINGS

FIG. 1 is a plan view of an oil control ring assembly according to this invention, with parts broken away to illustrate underlying parts;

FIG. 2 is an enlarged fragmentary vertical cross-sectional view of a piston and cylinder illustrating the oil ring groove in the piston equipped with a ring assembly of FIG. 1;

FIG. 3 is a fragmental isometric illustration of the spacer-expander of FIGS. 1 and 2 in an expanded condition;

FIG. 4 is a front-end elevational view of a segment of the spacer-expander of FIG. 3 and a portion of the rail ring carried thereby in the contracted condition as used in a piston and cylinder assembly;

FIG. 5 is a plan view of the contracted spacer-expander and rail ring portion shown in FIG. 4 but showing the segment before it is shaped into ring form;

FIG. 6 is an isometric view similar to FIG. 3 but illustrating a modified spacer-expander equipped with struts preventing entry of the rail ring into the channel of the spacer-expander; and FIG. 7 is a view similar to FIG. 2 but illustrating the modified spacer-expander of FIG. 6.

DESCRIPTION OF THE PREFERRED EMBODIMENTS

The oil control ring assembly 10 of FIGS. 1 and 2 includes a steel split spacer-expander ring 11 of this invention and a thin split steel rail ring 12 supported on the top thereof. The spacer-expander ring 11 has its ends 11a abutted together in use shown in FIG. 1 to provide a continuous annular circumferential spring. The ends 12a of the rail ring may be slightly spaced apart in use.

As shown in FIG. 2 the oil control ring assembly 10 is carried in the oil ring groove G of a piston, such as an internal combustion engine piston P which is mounted in an engine cylinder C. The ring groove G has drainage holes such as H in the bottom thereof communicating with the interior of the piston P for free flow of oil in the groove.

The rail ring 12 is supported on top of the spacer-expander 11 and its inner periphery is engaged by angled tabs or lips on spring fingers of the spacer-expander to exert a radially and axially outward force on the rail ring urging it into sealing engagement with the top sidewall of the ring groove as well as into sealing engagement with the cylinder C. The spacer-expander is contracted from its free state condition in the ring groove and has axially spaced top and bottom scraping edges or peripheries urged into sealing engagement with the cylinder C. The assembly 10 is thus a single rail ring equipped oil control ring allowing free circulation of oil in the ring groove G but sealing oil against leakage between the piston and cylinder.

As best shown in FIG. 3 the spacer-expander ring 11 is of the outwardly opening channel ring type with a channel 13 between a top ring 14 and a bottom ring 15 held in axially spaced relation by upstanding legs 16 at spaced intervals around the inner periphery of the ring 11. The top ring 14 is composed of a row of circumferentially spaced radially extending crowns or land segments 17 while the bottom ring 15 is composed of a row of similar crowns or land segments 18 in staggered relation with the segments 17. Each segment 17 and 18 has a pair of legs 16 on its inner periphery with one leg connecting the segment in one row to the staggered segment in the other row.

The ends of each segment 17 in the top ring 14 are notched at their inner peripheries as at 19 and spring fingers 20 formed on the inner peripheries of the segments 18 extend into the recesses provided by these notches. Each spring finger 20 in its free state slopes radially outward to the bottoms of the notches 19 and has an angled lip 21 on its free end projecting above the ring 14. These angled lips are turned back from the forwardly sloping springs 20 to provide contact faces engaging the inner periphery of the rail 12 so as to force it axially upward as well as radially outward as shown in FIG. 2.

The segments 17 in the top ring 14 in the free state condition of the ring are separated by gaps 22 extending radially outward from the bottoms of the notches 19 in front of the spring fingers 20 while the segments 18 are separated by gaps 23 offset from the gaps 22 and aligned with the midportions of the segments 17.

The segments 17 forming the ring 14 have outer peripheral scraping edges 24 while the segments 18 forming the ring 15 have similar scraping edges 25.

When the assembly 10 is contracted in use as shown in FIGS. 4 and 5 the gaps 22 and 23 are closed or substantially closed and the top and bottom ring portions 14 and 15 thus have substantially continuous circular scraping edges 24 and 25 engaging the cylinder wall C as shown in FIG. 2. In addition, the spring fingers 20 are depressed radially inward from their free state condition and their angled lips 21 act on the inner periphery of the rail ring 12 to force it into side sealing engagement at 26 with the top sidewall of the ring groove G while the outer periphery 27 of the rail ring is forced into peripheral sealing engagement with the cylinder wall C. This side sealing force seats the bottom ring segments 18 on the bottom sidewall of the ring groove so that the assembly 10 is sealingly seated against both sidewalls of the ring groove and has three rings of sealing engagement with the cylinder wall C.

The contraction of the spacer-expander 11 in the cylinder creates a circumferential spring force which maintains the contact edges 24 and 25 against the cylinder wall C. The spring fingers 20 act independently on the rail ring 12 so that wide variations in radial depth of the rail ring relative to the spacer-expander can be accommodated without interfering with the sealing contacts with both the ring groove and the cylinder wall. Since both the top and bottom rings 14 and 15 of the spacer-expander engage the cylinder wall C, the assembly is stabilized against tilting or cocking in the ring groove.

The modified assembly 30 of FIG. 7 includes a spacer-expander 31 differing slightly from the expander 11 and all common parts of the assembly have been marked with the same reference numerals used in the description of FIGS. 1–5.

In the modified spacer-expander ring 31, the bottom crowns or land segments 18 are lanced providing a radial cut 32 extending inwardly from the outer periphery of each segment in spaced relation from one end thereof and are then cut at 33 longitudinally of the segment from the cut 32 into spaced relation from the other end of the segment. These cuts 32 and 33 isolate leg portions which are bent upwardly to form struts 35 across the channel 13 of the ring. These struts may terminate in closely spaced relation to the crowns or segments 17 or may rest against these crowns. The struts serve to stiffen the assembly and to prevent entry of the rail ring 12 into the channel during installation of the assembly in a piston ring groove. The laced out struts do provide notches in the contact or scraping edge 25 of the lower ring portion 14 and if desired, some of the crowns or segments 18 need not be provided with struts thereby providing a more continuous scraping edge 25 for the ring 31. The outer peripheral edges of the struts are either flush with or inwardly from the scraping edges 24 and 25 so as to not interfere with the sealing engagement of these scraping edges against the cylinder wall.

The modified assembly 30 functions in the same manner as the assembly 10.

From the above descriptions it will therefore be understood that this invention provides an oil control ring for internal combustion engine pistons and the like having a rail ring and a spacer-expander ring with two axially spaced peripheral scraping edges and spring fingers acting on the rail ring. The rings of this invention provide three rings of scraping edges with only two components and provide side sealing and rail ring expansion accommodating wide variations in dimension differences between the components and acting independently of the contraction of the spacer-expander ring.

I claim as my invention:

1. A two component oil control piston ring having three peripheral scraping edges which comprises a circumferentially expansible and contractable spacer-expander ring having axially spaced ring portions with peripheral scraping edges, a rail ring supported on one of said ring portions, and spring fingers on the other of said ring portions acting independently of the expansion and contraction of the spacer-expander ring against the inner periphery of the rail ring in an axially and radially outward direction.

2. An oil control piston ring comprising a circumferentially expansible and contractable spacer-expander having axially spaced peripheral rings each composed of a row of circumferentially spaced ring segments, the segments in one row being connected to adjacent segments in the other row by legs at spaced intervals around the inner periphery of the spacer-expander, spring fingers on the inner periphery of the segments of one row extending above the segments of the other row, said spring fingers being isolated from said legs to act independently of the expansion and contraction of the spacer-expander, a rail ring supported on the segments of the other row acted on by said spring fingers, and said rail ring and rows of spring segments providing three rings of scraping edges.

3. A piston ring assembly comprising a circumferential spring ring having an outwardly opening channel defined by top and bottom rows of crowns providing two rings of cylinder wall scraping edges and upstanding legs at spaced intervals around the inner periphery of the spring ring connecting the crowns, spring fingers on the crowns of one row extending between some of the legs and projecting above the other row of crown to act independently of the circumferential expansion and contraction of said spring ring, and a rail ring supported on said other row of crowns engaged by said spring fingers around the inner periphery thereof to be urged against the cylinder wall and form a third scraping edge.

4. A piston ring comprising a circumferential expansion spring ring of U-shaped cross section having two rings of axially spaced scraping edges, a rail ring mounted on one of said two rings, and spring fingers projecting from the other of said two rings engaging the inner periphery of the rail ring acting independently of the circumferential expansion and contraction of said spring ring to force the rail ring axially and radially outward for forming a third scraping edge and a ring groove side seal.

5. A spacer-expander piston ring which comprises a circumferential spring ring of U-shape cross section having axially spaced rings of cylinder-wall-scraping edges connected by upstanding axially extending legs at spaced intervals around the inner periphery of the spring ring, and spring fingers extending between some of said legs projecting from one ring above the other ring to act independently of the circumferential expansion and contraction of said spring ring.

6. The piston ring of claim 1 wherein each of the axially spaced ring portions of the spacer-expander ring is composed of a row of circumferentially spaced crowns.

7. The piston ring of claim 1 having axially extending circumferentially spaced legs connecting the ring portions of the spacer-expander ring with the spring fingers positioned between some of said legs.

8. The piston ring of claim 2 wherein the segments in said other row have notches in their inner periphery receiving the spring fingers.

9. The piston ring of claim 2 wherein the segments of said one row each have two legs and a spring finger between the two legs.

10. The piston ring of claim 3 wherein the crowns of one row have notched inner peripheral end portions providing recesses receiving the spring fingers.

11. The piston ring of claim 3 wherein the spring fingers have free ends radially outward from the legs.

12. The piston rings of claim 11 wherein the free ends of the spring fingers have rearwardly inclined lips.

* * * * *